Feb. 24, 1970  J. HUREAU  3,496,965
EXTRUDED PLASTIC TUBULAR STRUCTURE HAVING
A RECTANGULAR MESH APERTURED WALL
Original Filed Dec. 18, 1961  5 Sheets-Sheet 1
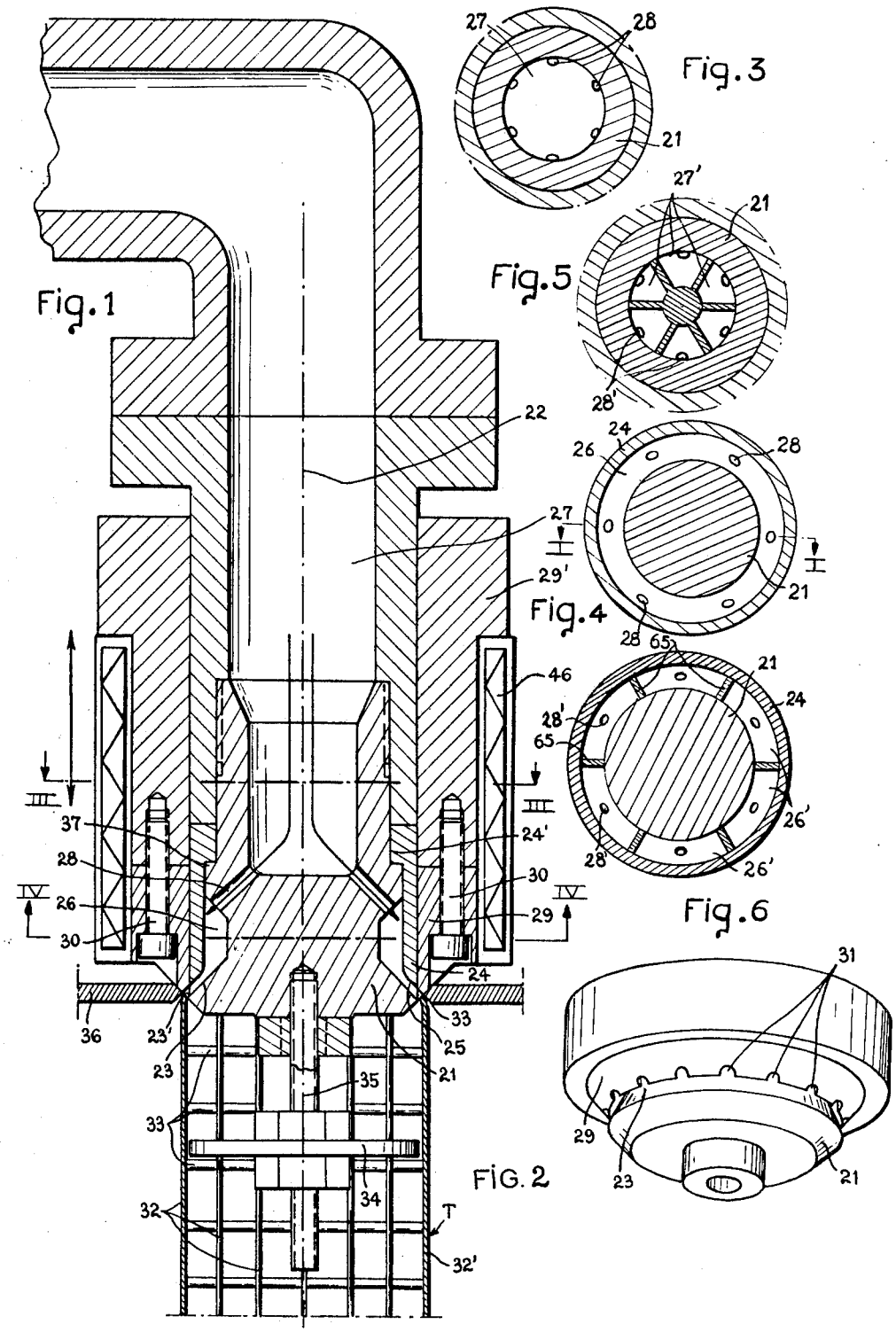

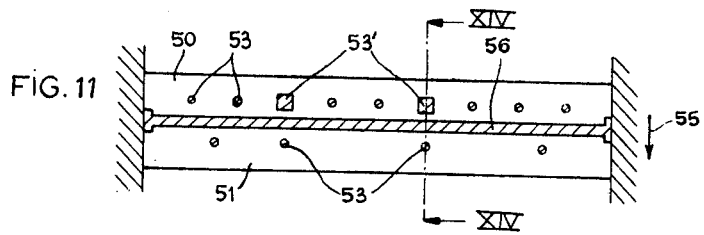
FIG. 11
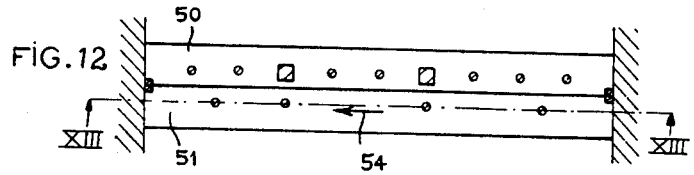
FIG. 12
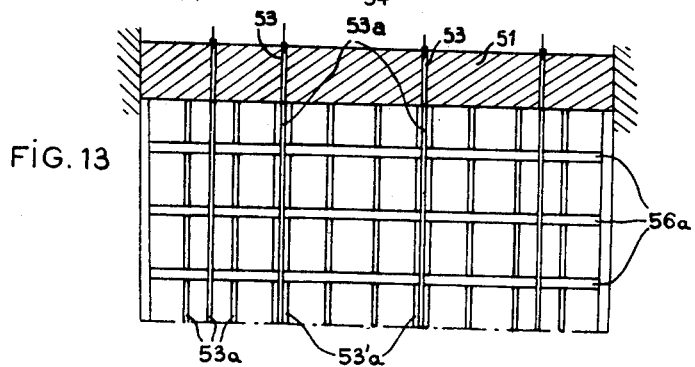
FIG. 13
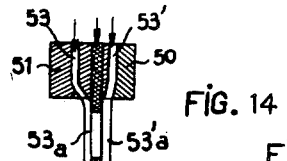
FIG. 14
FIG. 21
FIG. 22
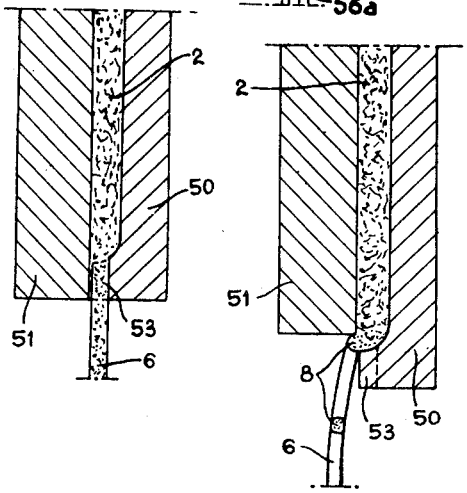

United States Patent Office 3,496,965
Patented Feb. 24, 1970

3,496,965
EXTRUDED PLASTIC TUBULAR STRUCTURE HAVING A RECTANGULAR MESH APERTURED WALL
Jacques Hureau, Paris, France, assignor to Societa Generale Alimentaire GASA, Neuilly-sur-Seine, Hauts-de-Seine, France, a company of France
Original application Dec. 18, 1961, Ser. No. 159,965, now Patent No. 3,252,181, dated May 24, 1966. Divided and this application Apr. 7, 1966, Ser. No. 534,485
Claims Priority, application France, Dec. 28, 1960, 848,186
Int. Cl. F16l *11/00, 9/00*
U.S. Cl. 138—123     4 Claims

ABSTRACT OF THE DISCLOSURE

An extruded, integral, plastic tubular structure having a net-like, apertured wall made of a plurality of axial strands spaced from each other in a circumferential direction. A plurality of parallel, closed, seamless strands cross the axial strands at ninety degrees and are axially spaced on the tubular structure joined integrally with the axial strands at each intersection so that the tubular structure has a rectangular mesh defining the apertured wall thereof.

---

This is a division of my application Ser. No. 159,965, filed on Dec. 18, 1961, for "Production of Profiled Pieces Showing a Lacunar or Reticulated Structure."

This invention is related to the manufacturing of pieces such as sheets, plates, tubes, etc., having at least in part a net-like structure (grid, trellis, net, cloth, etc.), specially in synthetic material.

A process according to the invention, for manufacturing with a rapidly solidifiable material, articles having at least in part a net-like structure, comprises for instance extruding a plurality of strands of the material, generally parallel to each other and generally parallel to the direction of extrusion, and, while continuously extruding the plurality of separate, parallel strands, at each of successive intermittent, predetermined intervals, extruding in integral relationship to the parallel strands, a strand extending transversely to all of the parallel strands. Integral extruded intersections of each transversely extruded strand with all parallel strands are formed thereby.

Another embodiment of this invention comprises extruding a plurality of separate strands, parallel to each other and to the direction of extrusion, and having a uniform thickness from one of the opposite faces of the thin-walled article to the other, at a predetermined time intermittently interrupting the extrusion of the parallel strands, and extruding a strand extending transversely to, and integral with the ends of all the parallel strands just extruded, then extruding again a similar plurality of separate parallel strands as the first-mentioned plurality, with their ends being integral with the transversely extending strand just extruded, and continuing to extrude alternately a transversely extending strand and a plurality of parallel strands. If all strands are extruded with a uniform thickness, an integral extruded article having a net-like structure and a uniform thickness is obtained thereby.

Subsequent to extruding the integral extruded articles can be subjected to tensions to elongate the strands thereof.

The invention is also related with articles of plastic material having at least in part a net-like structure, and each comprising for instance a plurality of separate elongated strands, continuously extending all along the width of the net-like structure and disposed in a spaced and parallel relationship to each other all along the length of the net-like structure, and between each pair of adjacent long strands, a plurality of separate, short strands, also disposed in a spaced and parallel relationship to each other all along the width of the net-like structure, and extending transversely from a first long strand to a second long strand adjacent to the first one, with the ends of the short strands being respectively integral with said first and second strands. If all strands are extruded with a same thickness, the extruded article has net-like walls of substantially uniform thickness.

A net-like sheet of a plastic material according to this invention, comprises between two straight bordering bands, extending parallel to each other all along the length of the sheet, a first plurality of separate strands extending parallel to the bordering bands and disposed in a spaced relationship to each other all along the width of the sheet, and a second plurality of separate strands extending transversely from one of the bordering bands to the other and disposed in a spaced and parallel relationship to each other all along the length of the sheet, so as to cross substantially at right angle all the separate strands of the first plurality, each intersection of the crossing strands being a homogeneous mass of plastic material.

A plastic tube with a thin wall having a net-like structure according to the invention comprises a first plurality of separate straight strands, extending in the axial direction of the tube, and disposed in a spaced and parallel relationship to each other all around the periphery of the tube, and a second plurality of separate annular strands, extending transversely to the axial direction of the tube, and disposed in a spaced and parallel relationship to each other all along the length of the tube, so as to cross all the separate strands of the first plurality, each intersection of the intersection strands being a homogeneous mass of plastic material.

These and further objects and features of this invention will become more apparent from the following description and accompanying drawing, wherein:

FIG. 1 is a sectional view of a first embodiment of a machine for putting this invention into practice.

FIG. 2 is a perspective view from below the machine in FIG. 1.

FIGS. 3 and 4 are cross-sectional views respectively along the lines III—III and IV—IV of FIG. 1.

FIGS. 5 and 6 are cross-sectional views of a variant of the embodiment in FIG. 1, along lines corresponding respectively to lines III—III and IV—IV of FIG. 1.

FIGS. 11 and 12 are plan views respectively of the two operative positions of a schematic extrusion machine for putting this invention into practice.

FIGS. 13 and 14 are cross-sectional views respectively along the lines XIII—XIII of FIG. 12 and XIV—XIV of FIG. 11.

FIGS. 21 and 22 are cross-sectional views respectively of the two operative positions of a seventh embodiment.

Figure 7:
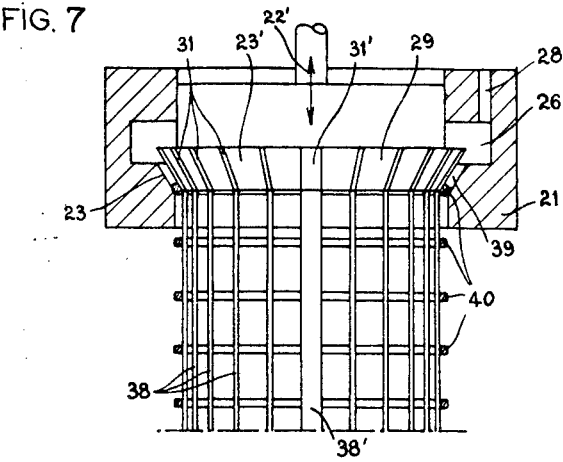
FIG. 7 is a view in partial cross-section of a second embodiment.

FIGURES 1 and 2 are different views of the extruding members of a machine for extruding a continuous net-like tube according to the invention. These extruding members are a fixed die 21, having the form of a solid of revolution about the axis 22. Its lower part is provided with a machine, annular, conical surface 23, diverging towards the base of die 21. An annular member 24 is fastened to the die 21, particularly at 24', so as to form with the machined surface 23 an annular extrusion channel 25, which extends in a downwards and circumferential direction. The upper, annular inlet of said channel 25 is fed with an extrudable material through an annular distribution chamber 26, which, in the example shown, is formed by a groove provided in the die 21 above the machined surface 23, this groove being closed peripherally by the annular member 24. The extrudable material is brought, in a convenient physical state, through the upper end of a channel 27, which extends axially in the part of the die 21 situated above the distribution chamber 26. Radial channels 28 are provided to connect the axial channel 27 to the distribution chamber 26. A movable die 29 is formed by a ring mounted about the lower part of the fixed die 21, above the lower edge of the machined surface 23, so as to be freely slidable along the ring 24 and the die 21. In the illustrated example, the movable die 29 is fastened for example by bolts 30 to a ring 29', which can slide along the middle and upper parts of the fixed die 21, in the direction of the axis 22. The lower part of the movable die 29 has also a machined, annular surface 23', by which the said die 29 can come into a close contact with the machined surface 23 of the fixed die 21, or at least with its lower edge. In the machined surface 23' of the die 29 are cut radial grooves or channels 31, the cross-sections of which open on the said machined surface 23'. A heating sleeve 46, comprising for example an electric resistance winding, is located around the movable die 29 and the ring 29', to which it is fastened, so as to bring the movable die 29, and, by thermal conduction, the fixed die 21, to a temperature close to the extrusion temperature of the extrudable material, inasmuch as this temperature is higher than ambient temperature. The machine comprises further means for periodically passing the movable die 29 and the fixed ring 29', to which it is fastened, by sliding along the fixed die 21 in the axial direction 22, from a first operative position, in which the machined surface 23' of the movable die 29 is in close contact with the corresponding machined surface 23 of the fixed die 21, to a second operative position, which is above the former in the example illustrated in FIG. 1, and in which the machined surfaces 23 and 23' of the two dies 21 and 29 are sufficiently spaced from each other to totally clear the outlet of the annular extrusion channel 25.

The extrusion of a net-like tube having rectangular meshes accordng to this invention, by using the extrusion machine in FIGS. 1 to 4, will now be described: Each time the two dies 21 and 29 are in close contact with one another along their machined surfaces 23, 23', so that the outlet of the annular channel 25 is locally obstructed by the intervals between the radial channels 31 of the die 29, the extrudable material brought through the distribution chamber 26 is extruded exclusively through the said radial channels 31, forming linear elements such as bars, strips, threads, etc., according to the cross-sectional dimensions of these linear elements, which depend on the cross-sectional dimensions of the said radial channels 31. These different linear elements extruded through the radial channels 31 form a tubular sheet, consisting of longitudinal, parallel elements 32, 32'. Each time the machined surfaces 23, 23' of the dies 21 and 29 are sufficiently spaced from one another, as a consequence of a raising movement of the die 29, so that the outlet of the annular channel 25 is totally clear, the extrudable material is extruded through the said annular channel 25 as an annular element 33, transverse to the linear, parallel elements 32, 32'. This transverse, annular element 33 is connected to the longitudinal, parallel elements 32, 32' at the crossing places thereof. These connections take place in the annular extrusion channel 25, or at least in the neighbourhood of its outlet. As a transverse annular element such as 33 is periodically extruded, a net-like tube T having rectangular meshes is obtained. As said meshes are formed by the longitudinal straight elements 32, 32' and the transverse annular elements 33, the net-like tube T has a remarkable dimensional stability in its both longitudinal and transverse directions.

The extruded tube T is immediately received below the outlet of the annular extrusion channel 25, on a gauge disc 34, which is fixed, for example by a screw 35, to the lower end part of the die 21. By means of a gauge disc 34 having a form and/or dimensions different from those of the cross-section of the tube T upon leaving the annular extrusion channel 25, it is possible, in taking advantage of the residual plasticity of the extruded material before its solidification, to modify the form and/or to increase or decrease the cross-sectional area of the tube T. It is also possible to modify the length of the extruded tube T before solidification, for example by applying tension forces on its longitudinal elements 32, 32', particularly by loading them with weights.

The means necessary for solidifying the tube T, which are to be adapted to the nature of the extruded material, has not been shown in FIGURES 1 and 2 because it is well known.

The machine which has just been described can easily be modified, as shown in cross-section in FIGS. 5 and 6, to extrude net-like tubes with parallel, longitudinal strips of different colors, and may be of different widths, by subdividing the annular distribution chamber 26, by means of radial partitions 65 (FIG. 6) in a corresponding number of sub-chambers 26', which are fed separately through conduits 28' and 27' (FIG. 5) with the differently coloured materials to be extruded.

As the radial channels 31 in the die 29 are cross-sectionally open on the machined surface 23', when the movable die 29 is in its upper operative position, the material which is extruded through the annular channel 25 flows as well through the said channels 31, so that there is no interruption in the extrusion of the linear, longitudinal elements 32, 32' during each transverse, annular element 33 is extruded. Consequently, each intersection of one longitudinal element such as 32 with a transverse element such as 33 has a cross-section, the area of which is nearly the sum of the areas of the cross-sections of said longitudinal and transverse elements. The extrusion of the longitudinal elements 32, 32' can also be interrupted when each transverse element such as 33 is extruded, by appropriate means, for example by a ring 36 which is disposed so as to stop, the outlets of the radial channels 31 of the die 29 when this last is in the upper operative position. This permits to extrude a tube having net-like walls of uniform thickness, including at the crossing places of the longitudinal and transverse elements.

In the embodiment illustrated in FIG. 1, the width of the annular extrusion channel 25 is determined by the spacing between the lower edge of the member 24 and the machined surface 23 of the die 21. This width can be modified either by making the member 24 movable relative to the die 21 in the direction of the axis 22, or by exchanging the member 24 for another having a different axial length. This makes it possible to adjust to the desired value the thickness of each transverse annular element 33. It is also possible for the member 24 to be integral with the die 21, the width of the annular extrusion channel 25 then being invariable.

The extruder illustrated in FIGS. 1 to 4 can also be operated in such a way that the two dies 21 and 29 are maintained in a constant position relative to each other, whereby the outlet of the annular extrusion channel 25 is always wholly clear, and a tube with a full wall is extruded therethrough. The parallel linear elements which are then extruded through the radial channels 31 cut in either one of dies 21 and 29, or in both, form continuous, longitudinal ribs on at least one of the inner and outer faces of the full-walled tube. Different materials can be used for extruding the full wall of the tube and the said longitudinal ribs. More generally it is also possible to extrude net-like tubes having longitudinal strips of different substances. When the outlet of the annular channel 25 is always maintained clear, means can be also provided for periodically changing the width of the outlet of this annular extrusion channel, so as to form on at least one of the inner and outer faces of the extruded full-walled tube, continuous ribs transverse to the continuous, longitudinal ribs formed through the radial channels 31.

The net-like or full-walled tubes extruded by the machine shown in FIGURES 1 to 4, particularly in synthetic material, can be cut longitudinally and be flattened into a sheet. These two operations can be carried out, in the case of a tube in a relatively rigid synthetic material, before solidifying the material. The net-like or full-walled tubes can be also used for manufacturing tubular containers, such as sacks, bags and so on, by closing one at least of their ends, specially by welding them (preferably before solidification), or by gluing or rivetting the said end.

FIG. 7 is a section by a diametric plane of an extrusion machine according to the invention, which comprises a fixed die 21, having an annular form of circular cross-section, and a smooth machine surface 23, having the form of a zone of a circular cone. A movable die 29 is placed inside the fixed annular die 21, so that its machined surface 23', having also the form of a zone of a circular cone, can be brought into close contact with the machined surface 23 of the fixed die 21 by a displacement of the die 29 relatively to the die 21 along their common axis, as it is indicated by the arrow 22'. The machined surface 23' of the movable die 29 is cut by channels of open cross-section, for instance channels or grooves of semi-circular cross-section 31, and by a single channel 31', of larger rectangular cross-section. The extrudable material is brought, in a physical state appropriate to its extrusion, into an annular distribution chamber 26 provided in the die 21, through a channel 28. When the die 29 is in its lowermost end position, in which its machined surface 23' is in close contact wth the machined surface 23 of the fixed die 21, the extrudable material brought into the distribution chamber 26 is extruded exclusively through the channels 31, 31', forming respectively the vertical bars 28 and the larger vertical band 38'. When the movable die 29 is in the position shown in FIGURE 7, in which the two machined surfaces 23 and 23' of the two dies are spaced from one another so as to provide between them an annular narrow space 39, the extrudable material brought into the distribution chamber 26 is not only extruded through the channels 31, 31', to form the linear vertical bars 38, 38', but it is equally extruded through the annular space 39 so as to form an annular ring such as 40. The different annular rings such as 40, which are successively formed each time the space 39 is periodically opened, resulting from a vertical oscillation of the movable die 29, along the arrow 22', are integral with the vertical bars 38, 38', and so form a tube having a net-like structure, and a circular cross-section. By cutting this tube along the axis of its band 38' and by developing it, a form of grid body having full edges is obtained. These two operations can be carried out after or before solidification of the material.

A similar net-like article can be made in the manner just described from any extrudable material, notably:

(1) Synthetic materials, particularly thermoplastic and thermosetting compositions, as well as natural and synthetic rubbers; in the first case, the thermoplastic material is heated in the extrusion machine to its softening temperature, then it is cooled suddenly beneath the die 21, for example by immersion in a liquid, by the action of a current of cold air, etc.; the two dies 21 and 29 of the machine are then maintained preferably at the extrusion temperature. These dies are made preferably of a metal which is a good heat conductor.

(2) Materials extrudable in a moist state, such as viscose, which can be extruded cold, the hardening thereof below die 21 being obtained by immersing in, or by spraying with an appropriate product.

(3) Glass.

(4) Metals and their alloys in pasty or molten state.

Figure 8:
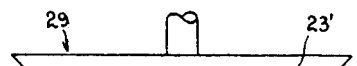
FIGS. 8 and 9 are respectively a side view and a cross-sectional plan view of the two die members of a third embodiment.
Figure 9:
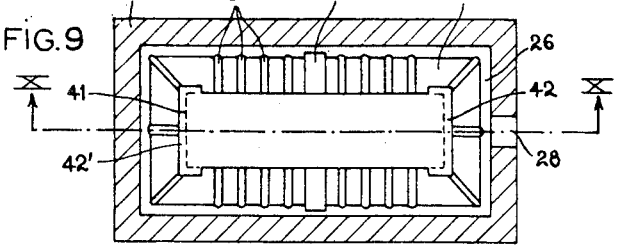
Figure 10:
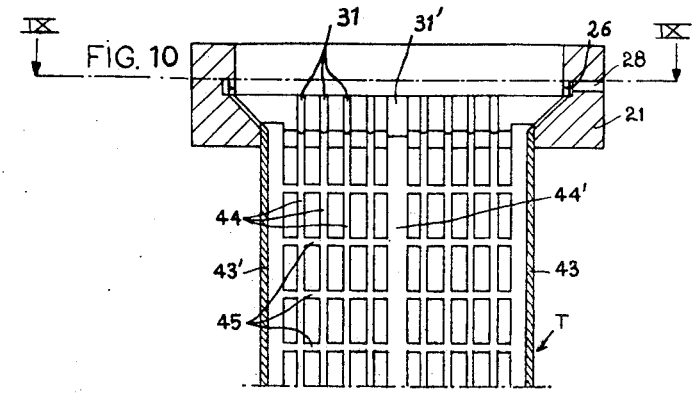
FIG. 10 is a cross-sectional view along the line X—X of FIG. 9.

The embodiment shown in FIGURES 8 to 10 comprises a fixed die 21 having an annular form, of rectangular cross-section, and a machined surface 23, in which transverse channels 31, 31' are cut. These channels differ in their forms and in the dimensions of their cross-sections. A movable die 29 has likewise a rectangular cross-section, but no channel is formed in its peripheral machined surface 23', which is adapted to come into close contact with the machined surface 23 of the die 21 when the die 29 is in its lower end position. The extrudable material is brought through a channel 28 into an annular distribution groove 26, from which it flows into the extrusion channels 31, 31', as well as into the space between the two dies 21 and 29. The rectangle in broken line 41 on FIGURE 9 represents the contour of the lower end face of the movable die 29 when its machined surface 23' is in contact with the machined surface 23 of the fixed die 21. It can be seen that the extrudable material is continuously extruded through the intervals 42, 42', to form the two full walls 43, 43' of the tube T, having in part a net-like structure, which is illustrated in FIGURE 10, in section by a longitudinal plane. These two full walls 43, 43', are connected to one another by two grid walls, of which one only is visible in FIGURE 10. These grid walls are each formed by linear vertical elements 44, 44', which are continuously extruded respectively through channels 31, 31', and by linear horizontal elements 45, which are periodically extruded in the space between the machined surfaces 23, 23' of the two dies 21 and 29. The tube T of rectangular cross-section thus obtained, can be split along one of its edges, before or after solidification, for forming for instance conditioning receptacles, particularly of a synthetic material, these receptacles comprising two grid walls.

FIGURES 11 and 12 illustrate schematically the operation of the most general embodiment of the machine according to the invention, which comprises two extrusion dies movable relative to one another, and of which one at least is provided with extrusion channels. On FIGURES 11 and 12, the two dies 50 and 51 are straight and parallel, but they may also be curved, and they are provided with extrusion channels 53, 53', substantially parallel with one another, and substantially perpendicular to the direction in which the said dies extend, so that the ends of these channels are seen on FIGURES 11 and 12. In the example illustrated, the extrusion channels with which the dies 50 and 51 are provided have close transverse cross-sections, which differ both in forms and dimensions, not only from one die to the other, but even in a same die. The die 50 for example comprises channels of circular cross-section 53, and channels 53' of rectangular cross-section, whilst the die 51 comprises only channels of circular cross-section 53. Moreover, the two dies 50 and 51 comprises different numbers of extrusion channels, and the channels of one die are not facing the channels of the other die. The two dies 50 and 51 can be displaced relative to one another, one for example being fixed and the other movable. It is already known to use a couple of dies of this kind to make sheets, plates or tubes having a net-like structure, by displacing the two dies 50 and 51 relative to one another in the sense of the arrow 54 on FIGURE 12, that is to say in making the dies 50 and 51 slide while maintaining them in close contact with one another, or at least at a constant distance from one another. One chief aim of the present invention is to extrude sheets, plates or tubes having at least in part a net-like structure, by using a couple of movable dies such as that illustrated on FIGURES 11 and 12, and alternately drawing together and separating the dies by a relative movement in the direction of the arrow 55 on FIGURE 12. The process of forming the net-like structure is as follows: When the two dies 50 and 51 are brought into close contact with one another as illustrated in FIGURE 12, the extrudable material, which is continuously discharged above the two dies 50 and 51, in the direction of their extrusion channels 53, 53', is extruded only through channels 53, 53', to form thereby linear, parallel elements, which, on FIGURE 13, have been designated respectively by 53a, 53'a. When the two dies 50 and 51 have been separated from one another in the sense of the arrow 55 (FIG. 11), and they are separated by a space 56 of uniform width, the extrudable material is extruded through this space 56, as a single linear element, transverse to the straight, parallel elements 53a, 53'a extruded through the channels 53, 53'. In the example illustrated, where these channels 53, 53' have closed sections, the connection between the linear elements 53a, 53'a and the linear elements 56a, which are formed successively, takes place clearly after the extrudable material leaves the outlets of the channels 53 and 53', that is to say below the dies 50 and 51, as visible on FIGURE 14. However, the channels 53, 53' of dies 50 and 51 may also open on the surfaces of dies 50 and 51, which are facing one another, that is in the space 56 between the dies when they are separated from one another (FIGURE 11). In this last embodiment, the channel outlets are closed by the said surface of the other die when the dies are in close contact (FIGURE 12). In this case, the connection between the linear elements 53a, 53'a and the linear elements 56a takes place precisely in the space 56 between the two dies 50, 51. With the embodiment illustrated on FIGURE 14, the vertical linear elements 53a, 53'a are on one side or the other of the horizontal linear elements 56a, according to whether they have been extruded through the die 50 or the die 51. Vertical elements 53a, 53'a being all on the same side of the horizontal elements 56a can be obtained by removing the extrusion channels of one of the two dies. It is also possible to obtain a sheet or plate having a net-like structure and a uniform thickness, by providing means for stopping the outlets of the extrusion channels of the dies 50, 51, only when these dies are separated from one another (FIGURE 11), space 56 having then preferably a uniform width nearly equal to the cross-sectional size of the outlets of the extrusion channels.

The machine just described with references to FIGURES 11 and 12 may also be operated in keeping the two dies 50 and 51 permanently at a constant distance from one another, so as to permanently extrude the extrudable material through the channels 53, 53' of the two dies, as well as through the space 56 (FIGURE 11). The extruded article is a sheet or plate of uniform thickness, one at least of the two faces of which has continuous parallel ribs, similar to reinforcing ribs. By periodically modifying the spacing of the two dies, it is also possible to form continuous ribs transverse to the former.

Figure 15:
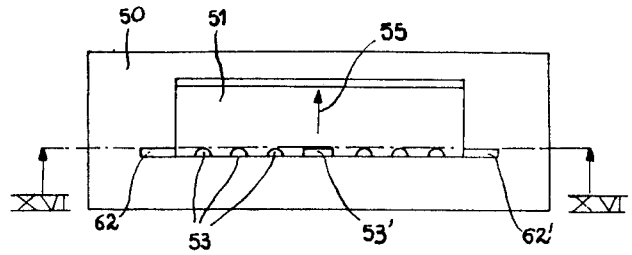
FIG. 15 is a plan view of a fourth embodiment.
Figure 17:
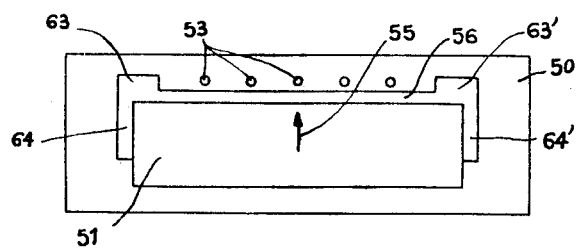
FIG. 17 is a plan view of a fifth embodiment.

FIGURES 15 and 17 are plan views of two further embodiments of the machine, the operation of which has been described above with reference to FIGURES 11 and 12. The dies 50 and 51 have extrusion channels 53, 53' and are mounted so as to slide with respect to one another, in a direction perpendicular to their extrusion channels 53, 53', which is indicated by arrow 55. The fixed die 50 is a tubular, hollow member, in which the solid die 51 is located so as to be displaceable alternatively between two positions, one in which the two dies 50, 51 are in close contact by their facing surfaces (FIGURE 15), and the other in which the facing surfaces of the two dies 50 and 51 are separated from one another so as to provide a space 56 between them (FIGURE 17). In the embodiment of FIGURE 15, only the movable die 51 comprises extrusion channels, which open on the surface of die 51 which faces the die 50. There are provided two kinds of channels 53, 53', different in the forms and dimensions of their cross-sections. In the embodiment of FIGURE 17, only the fixed die 50 comprises extrusion channels 53, having closed cross-sections and being all identical with one another.

Figure 16:
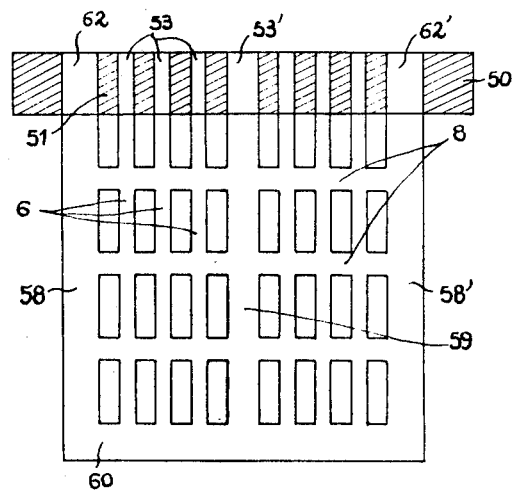
FIG. 16 is a cross-sectional view along the line XVI—XVI of FIG. 15.

There will now be briefly described the extrusion of the grid-like article of FIGURE 16 by means of the extruder of FIGURE 15. The two full vertical borders 58, 58' of the article of FIGURE 16 are formed by continuously extruding the material through inner recesses 62, 62' in the fixed die 50 of FIGURE 15, which are never stopped by the movable die 51, when it is displaced. The vertical strips 6 are formed by extruding the material through the open channels 53 of the movable die 51. The center strip 59 is also formed by extruding the material through channel 53' of the movable die 51. The horizontal strips connecting the borders 58, 58' of the grid-like article and its vertical strip 6, as well as the center strip 59, are formed by extruding the material through the space between the two dies 50 and 51 when the surface of the movable die 51, on which the channels 53, 53' open, is brought into the plane, the trace of which is indicated by the line XVI—XVI of FIGURE 15. Means may be provided for stopping the outlets of the extrusion channels 53, 53' so as to interrupt extruding the vertical strips 6 and the center strip 59 during the formation of each horizontal strip 8. The vertical strips 58, 58', 59, on the one part, and the horizontal strips 8 and 60—this last forming the lower full border of the grid article—on the other part, connect themselves together in the space between the two dies 50 and 51, through the open faces of the extrusion channels 53, 53'.

Figure 18:
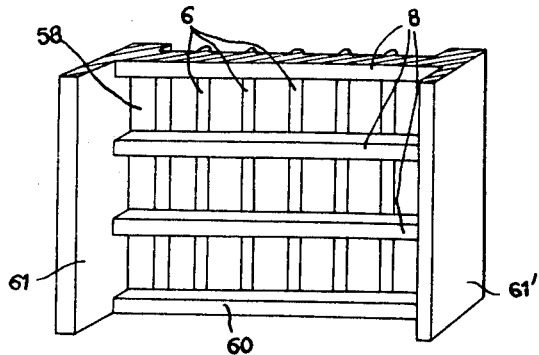
FIG. 18 is a perspective view of an article extruded with the machine illustrated in FIG. 17.

With reference to the conditioning receptacle in plastic material, having a grid-like base, which is shown on FIGURE 18, the full sides 61, 61', of this receptacle are formed by continuously extruding the extrudable material through inner recesses 64, 64' in the fixed die 50, which are never stopped by the movable die 51. The full edges 58, 58' of the grid base of the receptacle are continuously extruded through similar inner recesses 63, 63'. The horizontal bars 8 of this grid base are formed by extruding the material through the space 56 between the two dies 50 and 51 when they are in their relative positioned illustrated on FIGURE 17. The vertical bars 6 of the grid base are formed by continuously extruding the material through the channels with closed cross-section 53 of the fixed die 50, the outlets of these extrusion channels being kept open permanently. The vertical bars 6 and the horizontal bars 8, 60 of the base of the receptacle connect themselves together below the dies 50 and 51, that is to say outside the outlets of the extrusion channels 53.

Figure 19:
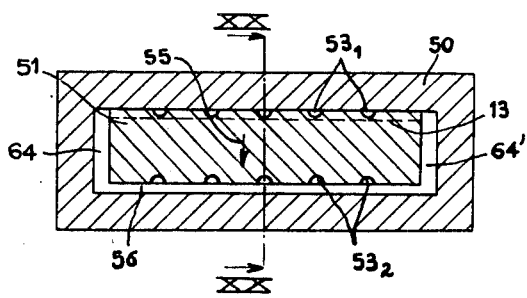
FIG. 19 is a cross-sectional view of a sixth embodiment.
Figure 20:
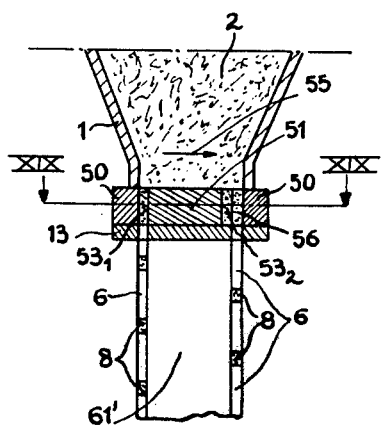
FIG. 20 is a cross-sectional view along the line XX—XX of FIG. 19.

The embodiment illustrated on FIGURES 19 and 20 comprises a hollow, tubular fixed die 50 and a solid, movable die 51. Open extrusion channels $53_1$, $53_2$ are provided on two flat surfaces of die 51, which face corresponding inner, flat surfaces of the hollow, fixed die 50. This machine can extrude a sort of tube having a rectangular cross-section, and comprising two full opposed sides 61, 61', which are continuously extruded through the recesses of constant size 64, 64', and two grid-like sides, which are extruded as the grid-like article of FIGURE 16. The horizontal elements 8 of said two grid-like sides are staggered as shown on FIGURE 20. A plate 13 split into a rectangular ring is located beneath the dies 50 and 51 (FIGURE 20), to regulate the thickness of the extruded tube. By splitting this tube along one of its edges, a conditioning element, particularly in a flexible material, can be obtained.

The embodiment shown on FIGURES 21 and 22 comprises a movable die 50 provided with extrusion channels 53, a stationary die 51, and means for displacing the movable die 50 parallel to the axial direction of said extrusion channels 53. In the position of dies 50, 51 which is shown on FIGURE 21, the extrudable material is extruded only through the channels 53 so as to form parallel linear elements (vertical) 6. In the positon of dies 50, 51 which is illustrated on FIGURE 22, the material is extruded through the unmasked slit between the two dies 50, 51, so as to form a single linear element (horizontal) 8. Appropriate means, not shown, may be adapted for interrupting the formation of the parallel elements 6 each time one element 8 is extruded.

It is to be understood that, in the position of FIGURE 22, the extruded single element 8 is extracted from the slit as an integral part of the extruded article, by the continuous movement of the extruded article in the axial direction, that is in the direction of the movement of die 50.

The embodiments of the invention previously described can be easily adapted to extrude at least in part net-like articles, having parallel, longitudinal strips of different colours and widths. This can be achieved by dividing the distribution chamber in a corresponding number of subchambers, each of which is fed, through a separate channel, with an extrudable material having a desired colour.

What I claim is:

1. An extruded, integral, plastic tubular flexible structure having an apertured wall with a net-like structure comprising, a plurality of axial flexible strands disposed spaced from each other in a circumferential direction, a plurality of closed, seamless, flexible strands joined integrally with said axial strands, said closed strands being disposed parallel to one another and spaced axially along the length of said tubular structure, said axial strands and said closed strands crossing at ninety degrees to each other and being integrally united with each other at each intersection, whereby said tubular structure is collapsible.

2. An extruded, integral, plastic tubular flexible structure having an apertured wall with a net-like structure according to claim 1, in which, each portion at each intersection constitutes an integral portion of a closed strand and constitutes a projection through said closed strand of a respective axial strand to which said closed strand is joined at said intersection.

3. An extruded, integral, plastic tubular flexible structure having an apertured wall with a net-like structure comprising, a plurality of axial flexible strands extending substantially parallel to the longitudinal axis of said tubular structure and disposed spaced from each other in a circumferential direction, said axial flexible strands being distributed throughout the circumferential extent of said tubular structure, and a plurality of closed, seamless flexible strands joined integrally with said circumferentially spaced axial flexible strands, said closed flexible strands being of equal axial extent and disposed parallel to one another and spaced axially along the full length of said tubular structure, said axial flexible strands and closed flexible strands crossing at ninety degrees to each other and being integrally united with each other at each intersection, said tubular structure comprising solely said axial and closed flexible strands, and each of said axial and closed flexible strands having the same respective cross sectional configuration throughout the axial and circumferential extent thereof, whereby said net-like structure comprises a flexible rectangular-mesh structure.

4. An extruded, integral, plastic tubular flexible structure having an apertured wall with a net-like, square-mesh structure comprising, a plurality of straight axial flexible strands extending axially of said tubular structure and disposed substantially equally spaced from each other in a circumferential direction and in parallel relationship to each other, said axial strands being distributed throughout the circumferential extent of said tubular structure, and a plurality of closed, seamless, circular, flexible strands joined integrally with said circumferentially spaced axial flexible strands, said circular flexible strands being disposed in parallel relationship to one another and substantially equally spaced along the length of said tubular structure, said tubular structure comprising solely said flexible axial and circular flexible strands, said axial flexible strands and circular flexible strands crossing at ninety degrees to each other and being integrally united with each other at each intersection by plastic material integral with a circular flexible strand and an axial flexible strand and constituting the same plastic material from which the respective crossing axial flexible strand and circular flexible strand are made at said intersection, whereby said tubular structure is collapsible.

References Cited

UNITED STATES PATENTS

| 2,888,937 | 6/1959 | Weldon. | |
| 2,966,913 | 1/1961 | Lerner et al. | 132—41 |
| 3,050,070 | 8/1962 | Sidelman | 132—39 |
| 3,070,840 | 1/1963 | Mercer. | |
| 3,085,292 | 4/1963 | Kindseth. | |

FOREIGN PATENTS

| 1,158,685 | 10/1956 | France. |
| 1,247,508 | 11/1959 | France. |
| 1,247,890 | 2/1960 | France. |
| 1,049,550 | 1/1959 | Germany. |

LAVERNE D. GEIGER, Primary Examiner

HENRY K. ARTIS, Assistant Examiner

U.S. Cl. X.R.

138—125, 178; 150—3; 161—70; 264—171, 174, 111